(12) United States Patent
Li (10) Patent No.: US 10,043,296 B2
(45) Date of Patent: Aug. 7, 2018

(54) VISUAL RELATIONSHIP BETWEEN TABLE VALUES

(71) Applicant: SAP SE, Walldorf (DE)

(72) Inventor: Tao Li, Potsdam (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/335,943

(22) Filed: Oct. 27, 2016

(65) Prior Publication Data

US 2018/0122109 A1    May 3, 2018

(51) Int. Cl.
| | |
|---|---|
| *G09G 5/22* | (2006.01) |
| *G06T 11/20* | (2006.01) |
| *G06F 17/30* | (2006.01) |
| *G06T 7/60* | (2017.01) |
| *G06T 7/40* | (2017.01) |
| *G06T 7/00* | (2017.01) |

(52) U.S. Cl.
CPC ...... *G06T 11/206* (2013.01); *G06F 17/30994* (2013.01); *G06T 7/0085* (2013.01); *G06T 7/408* (2013.01); *G06T 7/60* (2013.01); *G06T 2200/24* (2013.01)

(58) Field of Classification Search
CPC .............................. G06T 11/206; G06F 3/0482
USPC ............................................ 345/440, 440.2
See application file for complete search history.

(56) References Cited

U.S. PATENT DOCUMENTS

| | | | | |
|---|---|---|---|---|
| 5,557,716 | A * | 9/1996 | Oka | G06T 11/206 345/440 |
| 5,611,034 | A * | 3/1997 | Makita | G06T 11/206 345/440 |
| 5,880,742 | A * | 3/1999 | Rao | G06F 3/023 345/440 |
| 7,047,164 | B1 * | 5/2006 | Swift | H04L 12/66 345/440 |
| 2006/0061589 | A1 * | 3/2006 | Suyama | G06F 3/0482 345/606 |
| 2007/0211060 | A1 * | 9/2007 | Suyama | G06F 3/0482 345/440 |
| 2010/0238176 | A1 * | 9/2010 | Guo | G06T 11/206 345/440 |
| 2011/0205231 | A1 * | 8/2011 | Hartley | G06Q 40/00 345/440 |
| 2011/0310112 | A1 * | 12/2011 | Zolotovitski | G06T 11/206 345/589 |

(Continued)

*Primary Examiner* — Ryan R Yang
(74) *Attorney, Agent, or Firm* — Buckley, Maschoff & Talwalkar LLC (57) ABSTRACT

Provided are devices and methods for generating and displaying a table chart in which numerical values are replaced by objects. In one example, a method includes receiving a data table including a 2D array of cells storing numerical values, generating a table chart including a 2D array of cells visually depicting a relationship between the numerical values in the data table wherein the table chart represents the numerical values as objects in the table chart, and a size of an object varies based on a numerical value from the data table that is represented by the respective object in comparison to remaining numerical values from the data table that are represented by remaining objects, and displaying the table chart via a user interface. The generated table chart provides a quicker understanding of a relationship between values in a data table.

19 Claims, 7 Drawing Sheets
(1 of 7 Drawing Sheet(s) Filed in Color)

(56) References Cited

U.S. PATENT DOCUMENTS

2015/0228097 A1* 8/2015 Matange ............... G06T 11/206
345/440

* cited by examiner

FIG. 1

| Product / Country | Apples | Bananas | Carrots | Cherries | Mangos | Oranges | Peaches |
|---|---|---|---|---|---|---|---|
| Australia | 10,599 | 9,587 | 8,103 | 6,478 | 7,213 | 9,213 | 11,147 |
| Canada | 4,425 | 3,817 | 2,226 | 7,841 | 3,625 | 1,089 | 4,254 |
| France | 9,144 | 8,876 | 6,148 | 7,522 | 9,203 | 6,335 | 8,782 |
| Germany | 6,819 | 6,748 | 5,587 | 4,276 | 2,115 | 952 | 3,485 |
| UK | 8,911 | 8,658 | 6,358 | 7,591 | 9,112 | 6,983 | 9,133 |
| USA | 9,204 | 7,902 | 6,249 | 7,369 | 8,548 | 6,891 | 10,874 |

October 2013

| | Open Exposure | Hedging Quota | Hedged Portion |
|---|---|---|---|
| USD | 33,218 | 70% | 24,210 |
| JPY | 5,409 | 70% | 3,698 |
| GBP | 27,398 | 55% | 17,502 |
| CAD | 14,672 | 60% | 8,910 |
| AUD | 19,245 | 70% | 16,258 |
| ZAR | 21,200 | 65% | 13,987 |
| CHF | 21,981 | 60% | 12,785 |

613 (Open Exposure)
612 (Hedging Quota)
611 (Hedged Portion)

VISUAL RELATIONSHIP BETWEEN TABLE VALUES

BACKGROUND

Tables are visual instruments that are used to organize and store information in a structured format that typically includes a plurality of horizontal rows and a plurality of vertical columns. Often the rows and columns of a table have names or labels indicating a description of the data included therein. Tables are commonly used in many fields such as communication, research, analytics, and data storage, to name a few. For example, tables are commonly used to store data in a database (e.g., relational databases, file database, etc.) because of the structured format of the table. Tables are also commonly used in spreadsheets and files to provide viewers with an organized and orderly view of related data. Those more familiar with generating tables may further sophisticate a table by adding metadata, headers, footers, annotations, and the like.

Tables can be a useful mechanism for organizing two-dimensional data. However, one of the primary drawbacks of a table is the density of data that can be present in the table is not always easy to comprehend without expending a significant amount of time reading through the data, glancing at the headings, and possibly doing additional calculations. For example, a table may include hundreds, thousands, or even millions of values. In some cases, a user may need to read data one cell at a time to acquire and understand information from the table while also comparing each data value to both a column header and a row header. Furthermore, it can be difficult for the user to understand a relationship between different cells of data included in the table without reading the data values from most or all of the cells in the table.

BRIEF DESCRIPTION OF THE DRAWINGS

Features and advantages of the example embodiments, and the manner in which the same are accomplished, will become more readily apparent with reference to the following detailed description taken in conjunction with the accompanying drawings. Furthermore, the patent or application file contains at least one drawing that is executed in color. Copies of this patent or patent application publication with color drawings will be provided by the Office upon request and payment of the necessary fee.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments relate to generating and displaying a table chart in which numerical values are graphically represented by objects. The table chart uses objects to represent numerical values in place of the numerals of the numerical values. For example, an object may have a shape such as a polygon, a circle, a square, a rectangle, a hexagon, a triangle, or the like, and the shape may be the same throughout the cells of the table chart. Furthermore, a size of an object in the table chart may vary based on a numerical value represented by the object in relationship to other numerical values represented by remaining objects in the table chart. For example, the larger the numerical value represented by the object the greater the size of the object may be in the table chart. Furthermore, the table chart may include additional charts/objects next to each row and/or each column representing a sum of the numerical values of each row and/or each column. Accordingly, the table chart enables a user to quickly and easily comprehend the data included therein as well as identify a relationship between the data without having to read through rows and columns of numerical values by portraying the numerical values with objects instead of alphanumeric characters.

A table of numerical values typically includes rows and columns forming a two-dimensional (2D) array which is not very easy to comprehend without spending significant time looking at the data within the table and looking at the corresponding headers/labels that represent the data. The table chart may maintain the format of the table, including the rows and the columns, but instead of showing the numerals (or in addition to showing the numerals), the table chart displays objects (e.g., shapes, symbols, elements, and the like) having variable sizes based on the numerical values which they represent. The different sizes of an object represent different numerical values. Furthermore, in some examples, in response to a user selecting an object from the table chart, the table chart can reveal the exact value(s) behind the selected object.

Figure 1:
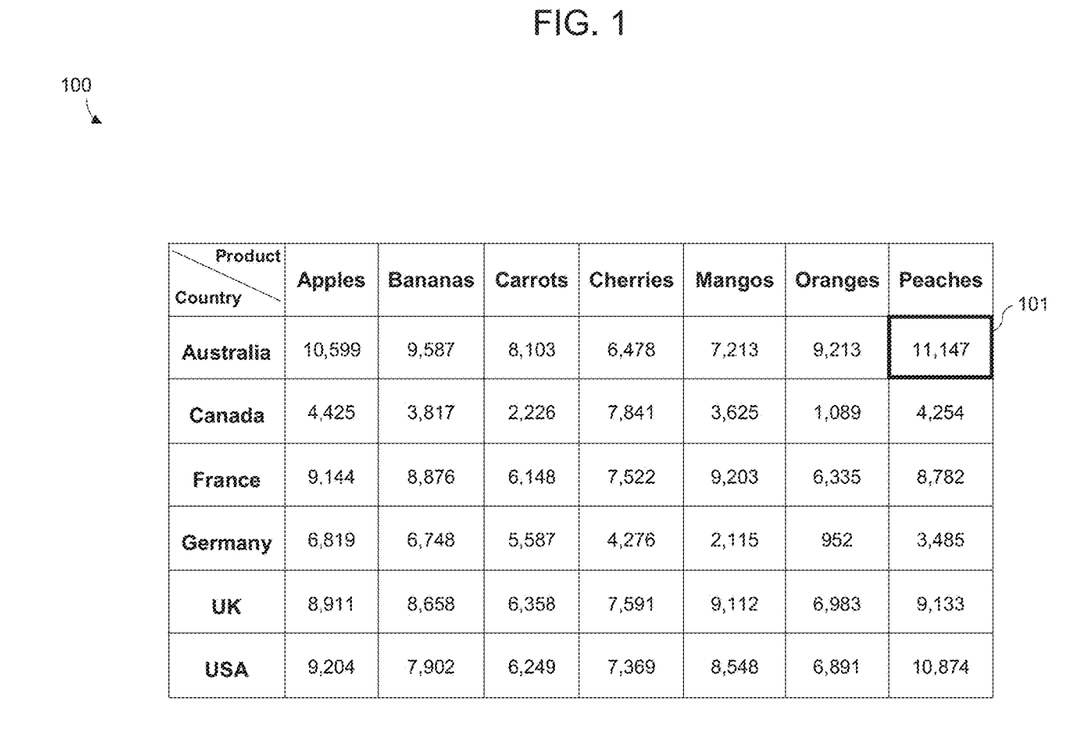
FIG. 1 is a diagram illustrating a table of numerical values in accordance with an example embodiment.
Figure 2:
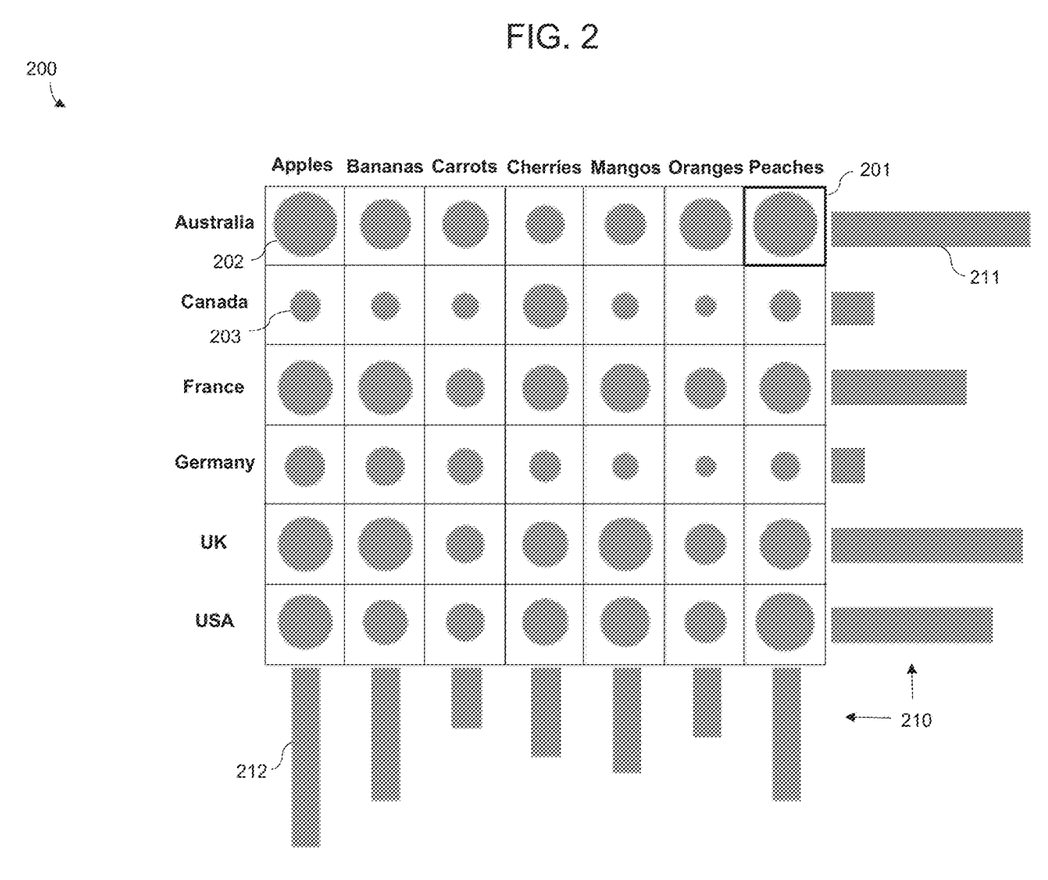
FIG. 2 is a diagram illustrating a table chart that is generated based on the table of FIG. 1, in accordance with an example embodiment.

FIG. 1 illustrates a data table 100 storing numerical values in accordance with an example embodiment, and FIG. 2 illustrates a table chart 200 that is generated based on the data table 100 of FIG. 1, in accordance with an example embodiment. Referring to FIG. 1, the table 100 includes a plurality of rows and a plurality of columns that combine to generate a two-dimensional array of cells. In this example, the cells include numerical values stored therein. Although each cell includes a numerical value in this example, the embodiments are not limited thereto. For example, some cells may be left blank and/or without numerical values. In FIG. 1, the horizontal rows of the table 100 include a value for a country and the vertical columns of the table 100 include a value for a type of fruit produced during a given time period. Accordingly, the table 100 provides cells (e.g., cell 101) of numerical values indicating an amount of a type of fruit produced by a country during a specific period of time. As one example, the cell 101 represents the amount of peaches produced in Australia in a particular period of time. In this example, the table 100 includes six rows and seven columns representing forty-two cells of numerical values which are not very easy to comprehend with a quick glance because of the density of the data.

Referring now to FIG. 2, the table chart 200 also includes six rows and seven columns representing forty-two cells of data. Here, each cell in the table chart 200 corresponds to a cell in the data table 100 (i.e., cell 201 in FIG. 2 represents cell 101 in FIG. 1). According to various embodiments, the numerical values of the data table 100 may be represented by graphical objects that are positioned at corresponding cells of the table chart 200. That is, rather than display numerical values, the cells in the table chart 200 depict objects which take the place of the numerical values or otherwise provide additional information along with the numerical values. Here, each cell displays an object having a common shape (i.e., a circle). However, it should be appreciated that the object may include any shape, symbol, graph, or the like. In addition, in order to indicate a relationship between numerical values represented by the respective objects included in the table chart 200, the objects are generated with different sizes that correspond to the respective numerical values which they represent.

In this example, object 202 in the table chart 200 represents a numerical value of 10,599 from the data table 100 which is one of the largest values included in the data table 100. Accordingly, the object 202 has one of the largest sizes in the chart table 200. That is, a radius of the circle (i.e., object 202) is a large radius in comparison to the radiuses of other circles in the chart table 200. Meanwhile, object 203 represents a numerical value of 4,425 from the data table 100 which is a small to medium value among the numerical values included in the data table 100. Accordingly, the object 203 is generated with a small to medium sized object in the chart table 200. That is, a radius of the circle (i.e., object 203) is a small radius in comparison to the radiuses of other circles in the chart table 200. As a result, a user can view the object 202 and the object 203 and based on the sizes of the respective objects, determine a ratio of their values. For example, if object 202 is roughly twice as big as the object 203, the user can easily see that the object 202 represents a numerical value that is roughly twice as big as the object 203 represents. Furthermore, patterns and trends can easily be identified throughout the table without having to read through numerical values in each cell.

In addition to generating a table chart 200, the example embodiments may also generate a bar graph chart 210 that supplements and that is provided with the table chart 200. For example, the bar graph chart 210 may be positioned adjacent to rows and below columns of the table chart 200 and may include a plurality of bar graphs representing an accumulation of values from a respective row and/or a column. In the example of FIG. 2, the bar graph chart 210 is positioned adjacent to the rows and below the columns of the table chart 200. For example, bar graph 211 is positioned adjacent to a top row of the chart table 200 and represents a summation of numerical values from a corresponding row of the data table 100. Here, the bar graph 211 represents a summation of numerical values of all types of fruit (Apples, Bananas, Carrots, Cherries, Mangos, Oranges, and Peaches) that were produced in Australia for a given period of time. In this example, the numerical values may be identified from the cells of the top row of the data table 100, a summation of the numerical values from the cells may be calculated to determine a summation value, and the bar graph 211 may be generated base on the summation value. The bar graph chart 210 also includes similar bar graphs for the other rows of the table chart 200 representing other countries. Furthermore, each bar graph may be positioned adjacent to a respective row of the table chart 200. The bar graph chart 210 provides additional information that is easily ascertainable by a viewer. For example, its quickly ascertainable that Canada and Germany struggled to produce fruit, while Australia and the UK did well in production.

As another example, bar graph 212 is positioned adjacent and below a first column of the chart table 200 and represents a summation of numerical values from a corresponding column of the data table 100. Here, the bar graph 212 represents a summation of numerical values of all countries (Australia, Canada, France, Germany, UK and USA) indicating a total number of Apples produced by those countries combined for a given period of time. In this example, the numerical values may be identified from the cells of the far left column of the data table 100, a summation of the numerical values from the cells may be calculated to determine a summation value, and the bar graph 212 may be generated base on the summation value. Furthermore, each bar graph may be positioned adjacent/below a respective column of the table chart 200.

Figure 3:
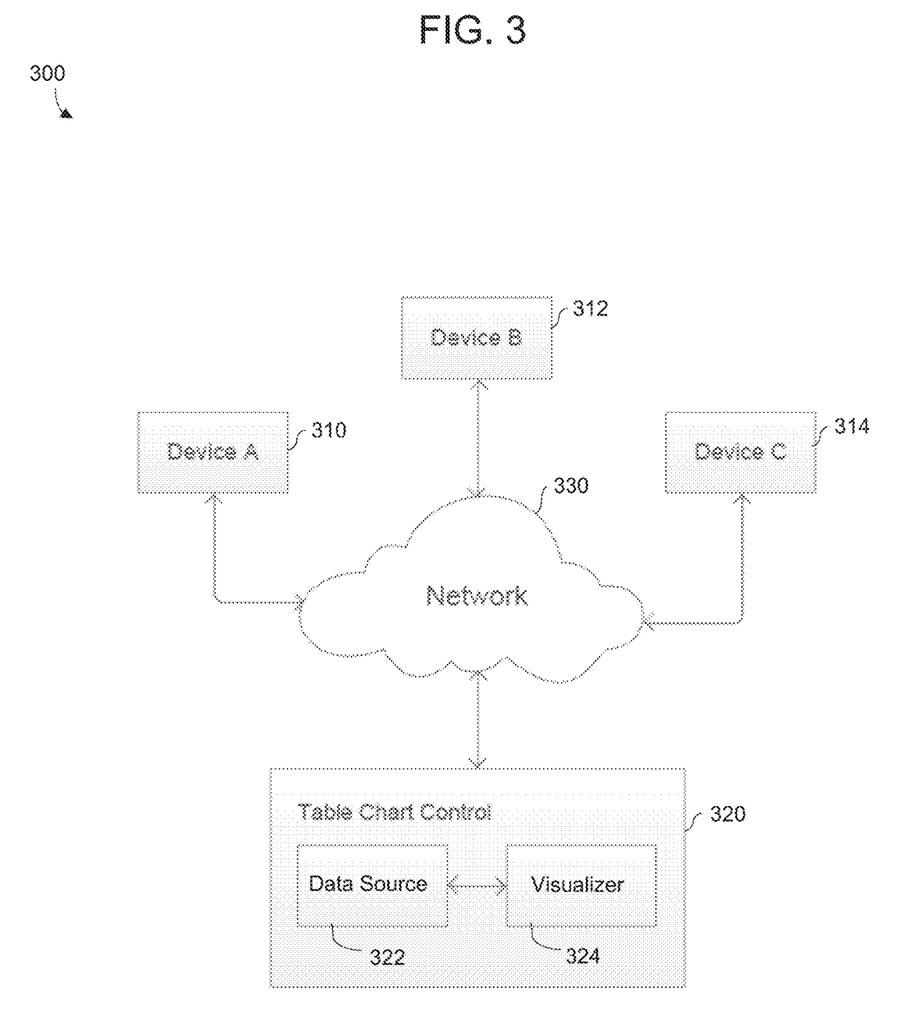
FIG. 3 is a diagram illustrating a system for generating and displaying a table chart in accordance with an example embodiment.

FIG. 3 illustrates a system 300 for generating and displaying a table chart in accordance with an example embodiment. Referring to FIG. 3, the system 300 includes a plurality of user devices 310, 312, and 314, which are connected to a table chart control device 320 via a network 330. The user devices 310, 312, and 314 may be computing devices such as laptops, desktops, notepads, tablets, mobile phones, appliances, smart wearable devices, and the like. The network 330 may include a public network such as the Internet, a private network, or a combination thereof. The table chart control device 320 may be a server, a database, a management system, or a combination thereof, and may be used to generate the table chart.

In one example, the table chart control device 320 is a database management system (DBMS) connected to the plurality of user devices 310, 312, and 314 via the Internet or other network. In this example, a table chart generating application (i.e., application) may be hosted by the table chart control device 320 and the application may be downloaded and installed on the user devices 310, 312, or 314. As another example, the table chart generating application may be hosted by the table chart control device 320 or an associated database and may be accessed by the user devices 310, 312, and 314 via the network 330 without having to store or to install the application. As another example, while a system is shown in FIG. 3, it should also be appreciated that the table chart application may be stored locally on a user device such as the user devices 310, 312, and 314 and executed locally such that a user of the respective device can generate a table chart locally based on data tables stored locally without accessing a back-end device or server.

The table chart control device 320 may include a data source 322 and a visualizer 324, as well as other components not specifically illustrated in FIG. 3. The data source 322 may be stored in a storage device and may include one or more tables of data included therein. For example, the data source 322 may be a spreadsheet, a notepad, a word file, a table, an array, and the like. The visualizer 324 may generate a table chart including an array of graphical objects based on numerical table data included in the data source 322. As an example, the table chart control device 320 may receive the data source 322 from one or more of the user devices 310, 312, and 314 via the network 330 and store the data files as the data source 322 in a storage device (not shown) of the table chart control device 320. As another example, the data source may be generated and stored locally at the table chart control device 320. Furthermore, in response to a command being received from one of the user devices 310, 312, or 314, the table chart control device 320 may generate a table chart, and output the table chart to a display of the respective device.

The table data included in the data source 322 may include an array of numerical values stored therein. The visualizer 324 may generate a table chart that visually illustrates a relationship between the numerical values in the data table by converting the numerical values into graphical objects. For example, each numerical value in the data table may be represented by a respective object in the table chart. The objects may be positioned at cells of the table chart that correspond to cells of the data table (i.e., on a one-to-one basis). Accordingly, the table chart generated by the visualizer 324 may include an array of objects that correspond to the array of numerical values of a data table. The objects may each have the same shape, but may differ or vary in sizes. According to various aspects, a size of an object in the table chart may vary from the sizes of other objects in the table chart based on a numerical value from the data table that is represented by the respective object in comparison to remaining numerical values from the data table represented by remaining objects in the table chart. That is, an amount of a numerical value may dictate a size of an object that is generated by the visualizer 324 to thereby represent the respective numerical value in the table chart.

Figure 4:
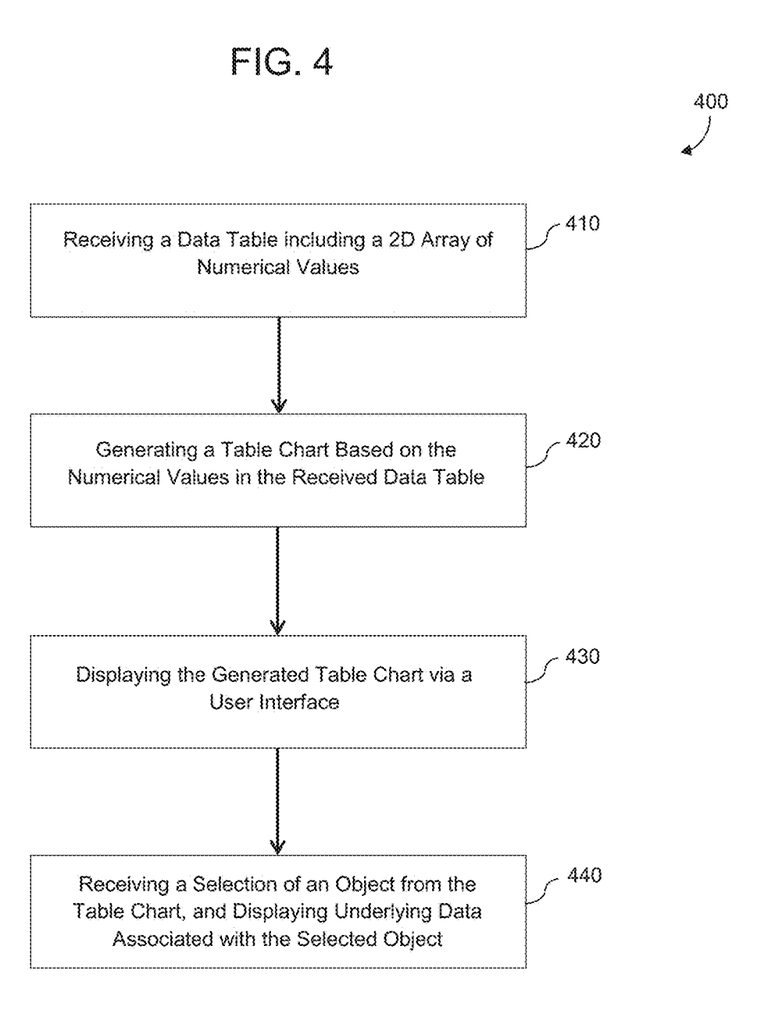
FIG. 4 is a diagram illustrating a method for generating a table chart in accordance with an example embodiment.

FIG. 4 illustrates a method 400 for generating a table chart in accordance with an example embodiment. For example, the method 400 may be performed by the table chart control device 320 of FIG. 3, or another device. Referring to FIG. 4, in 410 the method includes receiving a data table including a two-dimensional (2D) array of cells storing numerical values therein. For example, the 2D array may include a plurality of columns and a plurality of rows which define the array of cells. Each column and each row may have a respective identifier such as a label or other description. The identifier may indicate a measure or a value represented by cells in the row or column. Also, the rows and the columns may represent data having the same format (i.e., numerals). In some examples, all of the cells in the 2D array may be filled with numerical values, while in other examples, one or more of the cells in the 2D array may be blank or not otherwise filled with numerical values. In this later example, when the table chart is generated, the blank cells or cells filled with other data may not be used to generate the table chart, but may be skipped over and ignored.

In 420, the method further includes generating a table chart including a 2D array of cells visually depicting a relationship between the numerical values in the data table. For example, the numerical values of the data table may be converted into objects that are positioned at corresponding cells of the table chart. That is, the method may generate objects to visually represent the numerical values instead of or in addition to displaying alphanumeric characters of the numerical values. The table chart may have a same number of cells as the data table and each cell may have an object that represents a numerical value from a corresponding cell of the data table. The objects may each share a common shape, for example, a circle, a square, a triangle, a rectangle, an ellipse, a hexagon, a symbol, a graph, a polygon, or the like. In the example of FIG. 2, a shape of each object in the table chart is a circle or circle chart. In this example, a radius of the circle may vary based on a numerical value represented by the respective circle in comparison to the remaining numerical values represented by the other circles in the table chart. It should also be appreciated that the objects may not all share the same shape or symbol. For example, one or more of the objects may be a different shape or symbol than the other objects to further illustrate trends or patterns within the data.

In order to illustrate a visual relationship between the underlying numerical values represented by the objects in the table chart, a size of an object may vary based on a numerical value from the data table that is represented by the respective object in comparison to remaining numerical values from the data table represented by remaining objects in the table chart. For example, if a first numerical value is larger than a second numerical value in the data table, the first numerical value may be represented by a first object that is larger in size than a size of a second object that represents the second numerical value. That is, a generated size of the second object may be smaller than a generated size of the first object to identify that the second object represents a smaller numerical value than the first object.

In 430, the method further includes displaying the table chart via a user interface. The table chart may be displayed on a user device, on an external display screen, on a kiosk, on an appliance, or the like. The displayed table chart may visually illustrate a relationship between numerical values of a corresponding data table without requiring a user to read the numerical values to understand relationships between the cells of data. Furthermore, in an example in which the table chart does not display the underlying numerical value represented by the objects in the table chart, a user may select an object and the table chart may reveal the underlying numerical values on the display screen.

Furthermore, in 440 the method includes generating and displaying at least one bar graph chart in association with the table chart. For example, the bar graph chart may include a plurality of bar graphs corresponding to a plurality of rows and/or a plurality of columns of the table chart. For example, a bar graph may be generated for each column from among a plurality of columns of the table chart. In this example, each bar graph may represent a summation of numerical values represented by a plurality of objects included in the respective column of the table chart. A bar graph chart including the plurality of bar graphs may be displayed such that each bar graph is positioned adjacent to its respective column. As another example, a bar graph may be generated for each row from among a plurality of rows of the table chart. In this example, each bar graph may represent a summation of numerical values represented by a plurality of objects included in the respective row of the table chart. A bar graph chart including each bar graph may be displayed such that each bar graph is positioned adjacent to its respective row. A size of the bar graphs included in the bar graph chart may provide a visual relationship between the summation of each of the rows and each of the columns with respect to each other. For example, a bar graph having a larger size may represent a larger sum value than a bar graph having a smaller size.

Figure 5:
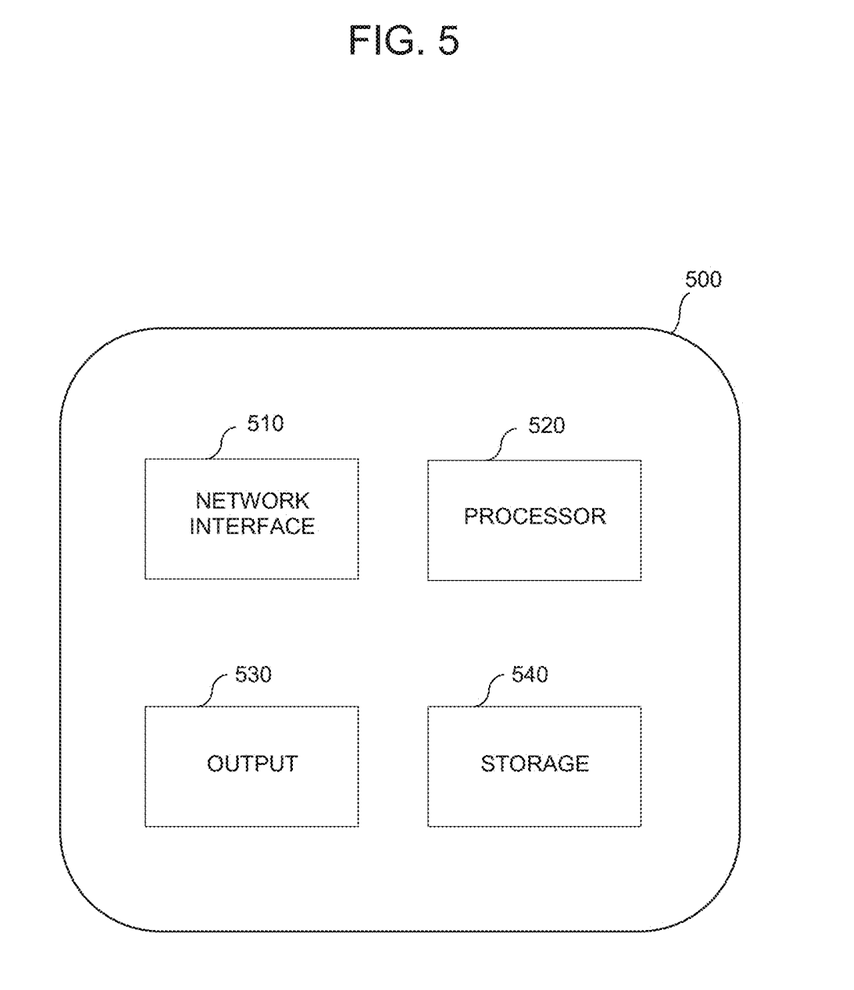
FIG. 5 is a diagram illustrating a device for generating a table chart in accordance with an example embodiment.

FIG. 5 illustrates a device 500 for generating a table chart in accordance with an example embodiment. For example, the device 500 may correspond to the table chart control device 320 shown in the system of FIG. 3, and may perform the method 400 of FIG. 4. The device 500 may include a computing device such as a server, a computer, a database, a database management system, a web server, and the like. Referring to FIG. 5, the device 500 includes a network interface 510, a processor 520, an output 530, and a storage device 540. Although not shown in FIG. 5, the device 500 may include other components such as a display, an input unit, a receiver/transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud storage platform, another device, and the like. The storage device 540 is not limited to any particular storage device and may include any known memory such as RAM, ROM, hard disk, flash disk, cache, and the like.

The device 500 may generate a table chart that graphically represents a numeric table of data and that provides a visual relationship between data values included in the table. The network interface 510 may receive data files from other devices connected to the device 500 via a network and the storage 540 may store the data files therein. For example, a data file may include at least one data table including a two-dimensional (2D) array of cells storing numerical values therein. The numerical values may be represented by alphanumeric characters. According to various embodiments, the processor 520 may generate a table chart that includes a 2D array of cells visually depicting a relationship between the numerical values in the data table by converting and/or replacing the numerical values of the data table into graphically displayed objects. For example, each object may have a common shape but may vary in size based on an amount of the numeric value. The objects may be positioned at corresponding cells in the table chart. Here, the table chart may have the same number of cells as the data table but instead of numerical values displayed within the cells, the table chart includes graphical objects.

According to various embodiments, a size of the objects in the table chart may vary based on a numerical value from the data table that is represented by the respective object in comparison to remaining numerical values from the data table represented by remaining objects in the table chart. For example, the processor 520 may generate larger objects to represent larger numerical values and generate smaller objects to represent smaller numerical values. The output 530 may output the generated table chart to a display screen. For example, the chart table may be displayed via a user interface capable of receiving input from a user. The processor 520 detect a selection of an object included in the table chart from a user via the user interface. In response to detecting the selection, the output 530 may display a numerical value that is represented by the selected object on the user interface. For example, the displayed numerical value may replace the object on the screen at the point of selection or it may be displayed in addition to the selected object. As a non-limiting example, a shape of each object in the table chart may include a circle, and a radius of each circle in the table chart may vary based on a numerical value represented by the respective object.

The processor 520 may also generate a bar graph chart and the output 530 may display the bar graph chart in association with the table chart. For example, the processor 520 may generate a bar graph for each column from among the columns of the table chart. In this example, each bar graph may represent a summation of numerical values that are represented by a plurality of objects included in the respective column of the table chart. In other words, the numerical values in the data table at a corresponding column may be aggregated to generate a sum total of the numerical values. This total may be represented as a bar graph chart, or some other type of chart. This process may also be performed for rows, as well. The output 530 may output each bar graph such that each bar graph is positioned adjacent to its respective column.

Figure 6:
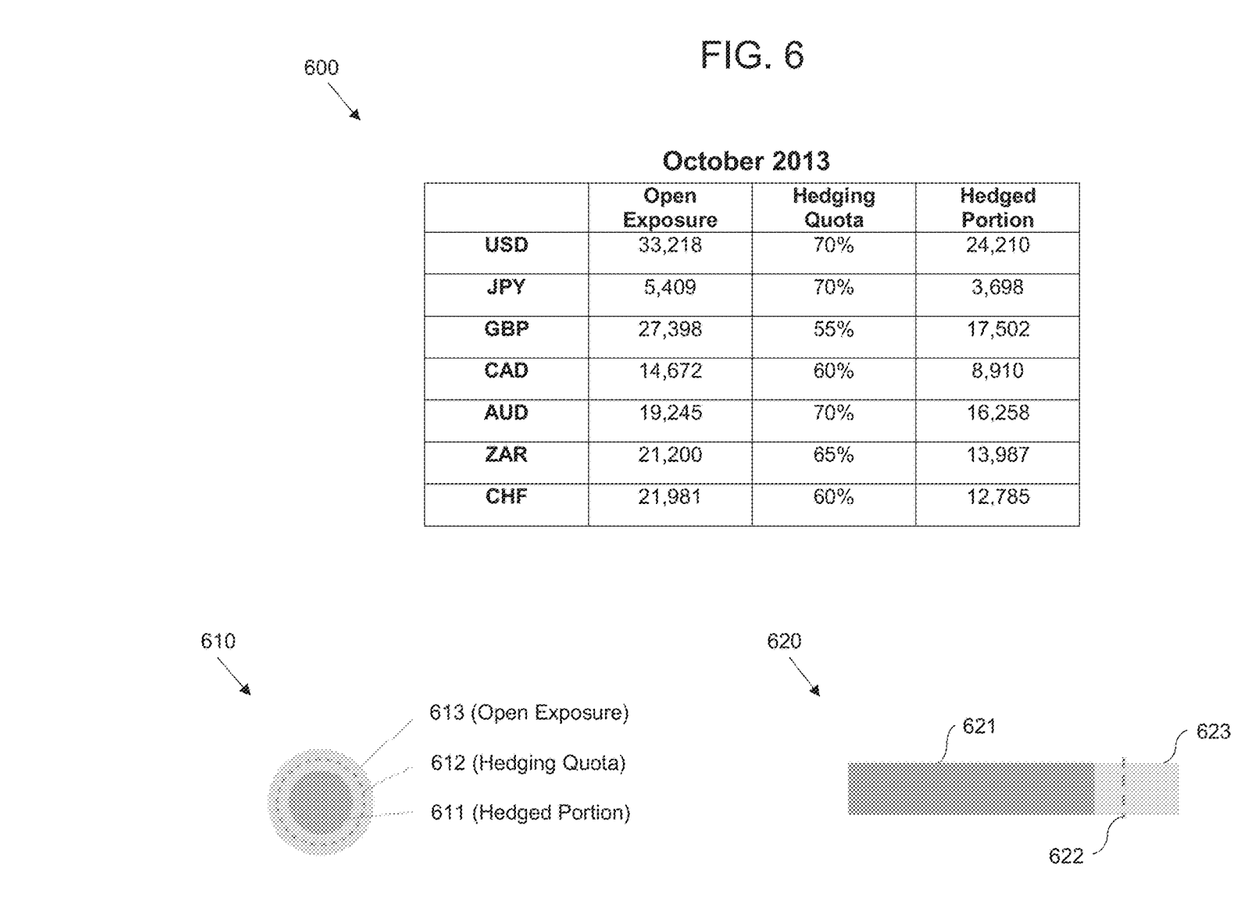
FIG. 6 is a diagram illustrating a table of numerical values and two sample objects in accordance with another example embodiment.
Figure 7:
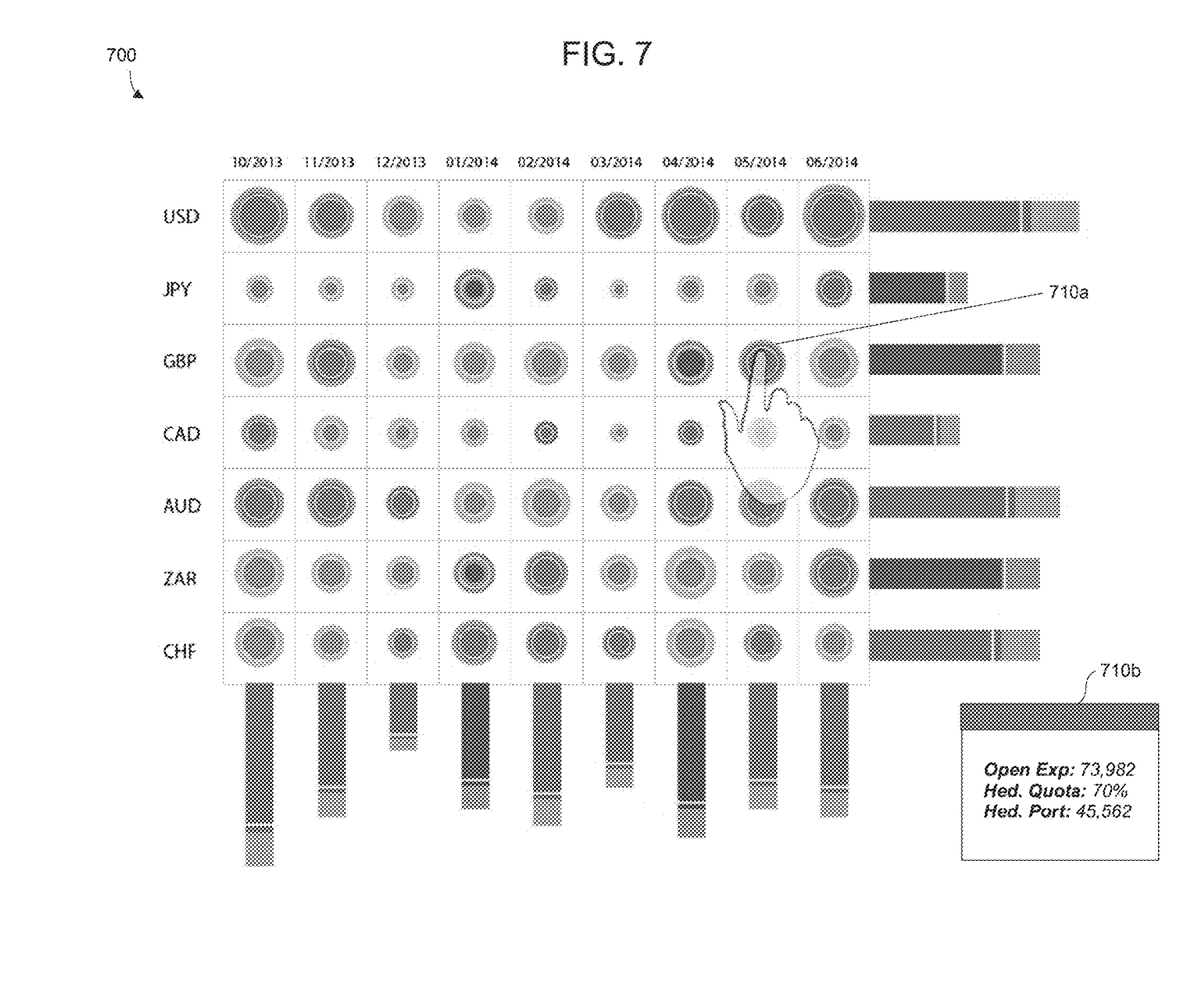
FIG. 7 is a diagram illustrating a table chart that is generated based on the table and the objects of FIG. 6, in accordance with an example embodiment.

FIG. 6 illustrates a table 600 of numerical values and two sample objects 610 and 620 in accordance with example embodiments, and FIG. 7 illustrates a table chart 700 that is generated based on the table 600 and the objects 610 and 620 of FIG. 6, in accordance with an example embodiment. Referring to FIG. 6, the table 600 includes a three by seven array of cells having numerical values stored therein that represent currency hedging measures. Each column also includes a header identifying the type of measure and each row includes a header identifying the currency. In this example, each row (i.e., currency) includes three measured values (i.e., currency exposure, hedging quota, and hedged portion) for the seven different currencies. According to various embodiments, a table chart can be generated representing each of the three measured values using a single graphical object as shown as objects 610 and 620. In other words, the three by seven array of cells in the table 600 may be represented by a one by seven array of graphical objects. As a result, twenty-one cells of numerical values may be represented by seven cells of a table chart.

Graphical object 610 illustrates a circle chart which has a solid center 611 that represents a first numerical value (i.e., hedged portion) from the table 600. In addition, the object 610 includes a shaded outer area 613 surrounding the solid portion and representing a second numerical value (i.e., open exposure) from the table 600. Furthermore, the object 610 also includes a broken line 612 surrounding the object 610 and positioned within the shaded outer area 613 to thereby represent a third numerical value (i.e., hedging quota percentage) from the table 600. Likewise, graphical object 620 illustrates a bar graph which has a solid portion 621 that represents the first numerical value from the table 600. In addition, the object 620 includes a shaded outer portion 623 adjacent to the solid portion 621 and representing the second numerical value from the table 600. Furthermore, the object 620 also includes a broken line 622 adjacent to the solid portion 621 and included within the shaded portion 623 to thereby represent the third numerical value from the table 600. In this example, the three numerical values of data can be represented using a single graphical object.

Referring to FIG. 7, table chart 700 is shown in which each graphical object in each cell represents multiple numerical values, and color is further used to represent additional information associated with the respective numerical values represented by the object. In this example, the red color means a currency is not hedged enough compared to a quota, the blue color means the currency is over hedged with respect to the quota, and the green color means the hedging of the currency is aligned with the respective quota. In this case, cells of the first column of table chart 700 correspond to the cells of all three columns of numerical values from table 600 that are shown in FIG. 6. Although not shown in the figures, the other columns in the table chart 700 of FIG. 7 correspond to similar tables of data.

In this example, the table chart 700 includes colored graphical objects 610 representing three numerical values from a data table, and also providing a fourth piece of information associated with the numerical values using color. In this example, the different colors are used to provide information about whether the currency is hedged according to a quota. In addition, shading around an outer edge of an object is used to indicate another numerical value represented by the at least one object. In addition, a broken line around an outer edge of the at least one object is used to indicate an additional numerical value represented by the object. In addition to graphical objects included within the table chart 700, the interface also includes bar graph charts including bar graphs 620 providing a summation of values for respective rows and columns. Similar to the circular graphical objects 610, the bar graphs provide three numerical values and a fourth piece of information using color.

Furthermore, in this example a user selects a graphical object 710*a*. In response, the table chart 700 reveals the underlying numerical values of the selected object in a window 710*b* (i.e., open exposure, hedged quota, and hedged portion). In this example, the window 710*b* is displayed separately for convenience of explanation but it should be appreciated that the window 710*b* may be displayed in place of the graphical object 710*a* in response to being selected.

The example embodiments are directed towards generating and displaying a table chart depicting a relationship between numerical values included in a data table. Rather than display a dense table of numerical values with many different alphanumeric characters, the table chart may display a table chart of commonly shaped objects (e.g., circles, squares, triangles, etc.) that have a variable size to identify a numerical value represented by the object in comparison to numerical values represented by other objects in the table chart. Simply by viewing a size of an object in comparison to sizes of other objects in the table chart, a viewer can readily understand a value of a numerical value represented by the object with respect to other numerical values represented by other objects in the table chart.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A device for generating and displaying a visual relationship between table values, the device comprising:
   a storage configured to store a data table comprising a two-dimensional (2D) array of cells storing numerical values therein;
   a processor configured to generate a table chart comprising a 2D array of cells visually depicting a relationship between the numerical values in the data table, wherein the table chart represents the numerical values of the data table as objects in the table chart, and, for each object, a size of the object is generated based on a numerical value from the data table that is represented by the respective object in comparison to remaining numerical values from the data table that are represented by remaining objects in the table chart; and
   an output configured to output the table chart to a user interface,
   wherein the processor is further configured to receive a selection of an object included in the table chart, via the user interface, and the output is further configured to output a numerical value that is represented by the selected object via the user interface.

2. The device of claim 1, wherein the numerical values stored in the data table include a first numerical value and a second numerical value that is smaller in value than the first numerical value, and
   the processor generates a first object in the table chart that represents the first numerical value and a second object in the table chart that represents the second numerical value, and a generated size of the second object is smaller than a generated size of the first object to identify that the second object represents a smaller numerical value than the first object.

3. The device of claim 1, wherein a shape of the objects in the table chart are common throughout the table chart.

4. The device of claim 1, wherein a shape of each object in the table chart is a circle, and a radius of the circle varies based on a numerical value represented by the respective object in comparison to remaining numerical values represented by remaining objects in the table chart.

5. The device of claim 1, wherein the processor is further configured to generate a bar graph for each column from among a plurality of columns of the table chart, each bar graph representing a summation of numerical values represented by a plurality of objects included in the respective column of the table chart, and
the output is configured to output a bar graph chart including each bar graph such that each bar graph is positioned adjacent to its respective column in the table chart.

6. The device of claim 1, wherein the processor is further configured to generate a bar graph for each row from among a plurality of rows of the table chart, each bar graph representing a summation of numerical values represented by a plurality of objects included in the respective row of the table chart, and
the output is configured to output a bar graph chart including each bar graph such that each bar graph is positioned adjacent to its respective row in the table chart.

7. The device of claim 1, wherein the processor is configured to color at least one object included in the table chart a different color than the remaining objects to indicate additional information about a numerical value represented by the at least one object.

8. The device of claim 1, wherein the processor is configured to generate shading around an outer edge of at least one object to indicate additional information about a numerical value represented by the at least one object.

9. The device of claim 1, wherein the processor is configured to generate a broken line around an outer edge of at least one object to indicate additional information about a numerical value represented by the at least one object.

10. A method for generating and displaying a visual relationship between table values, the method comprising:
receiving a data table comprising a two-dimensional (2D) array of cells storing numerical values therein;
generating a table chart comprising a 2D array of cells visually depicting a relationship between the numerical values in the data table, wherein the table chart represents the numerical values of the data table as objects in the table chart, and, for each object, a size of the object is generated based on a numerical value from the data table that is represented by the respective object in comparison to remaining numerical values from the data table that are represented by remaining objects in the table chart;
displaying the table chart via a user interface; and
receiving a selection of an object included in the table chart, via the user interface, and in response, outputting a numerical value that is represented by the selected object via the user interface.

11. The method of claim 10, wherein the numerical values stored in the data table include a first numerical value and a second numerical value that is smaller in value than the first numerical value, and
the generating comprises generating a first object in the table chart that represents the first numerical value and a second object in the table chart that represents the second numerical value, and a generated size of the second object is smaller than a generated size of the first object to identify that the second object represents a smaller numerical value than the first object.

12. The method of claim 10, wherein a shape of the objects in the table chart are common throughout the table chart.

13. The method of claim 10, wherein a shape of each object in the table chart is a circle, and a radius of the circle varies based on a numerical value represented by the respective object in comparison to the remaining numerical values represented by the remaining objects in the table chart.

14. The method of claim 10, wherein the generating further comprises generating a bar graph for each column from among a plurality of columns of the table chart, each bar graph representing a summation of numerical values represented by a plurality of objects included in the respective column of the table chart, and
displaying a bar graph chart including each bar graph such that each bar graph is positioned adjacent to its respective column in the table chart.

15. The method of claim 10, wherein the generating further comprises generating a bar graph for each row from among a plurality of rows of the table chart, each bar graph representing a summation of numerical values represented by a plurality of objects included in the respective row of the table chart, and
displaying a bar graph chart including each bar graph such that each bar graph is positioned adjacent to its respective row in the table chart.

16. The method of claim 10, wherein the generating comprises coloring at least one object included in the table chart a different color than the remaining objects to indicate additional information about a numerical value represented by the at least one object.

17. The method of claim 10, wherein the generating comprises generating shading around an outer edge of at least one object to indicate additional information about a numerical value represented by the at least one object.

18. The method of claim 10, wherein the generating comprises generating a broken line around an outer edge of the at least one object to indicate additional information about a numerical value represented by the at least one object.

19. A non-transitory computer readable medium having stored therein instructions that when executed cause a computer to perform a method for generating and displaying a visual relationship between table values, the method comprising:
receiving a data table comprising a two-dimensional (2D) array of cells storing numerical values therein;
generating a table chart comprising a 2D array of cells visually depicting a relationship between the numerical values in the data table, wherein the table chart represents the numerical values of the data table as objects in the table chart, and, for each object, a size of the object is generated based on a numerical value from the data table that is represented by the respective object in comparison to remaining numerical values from the data table that are represented by remaining objects in the table chart;
displaying the table chart via a user interface; and
receiving a selection of an object included in the table chart, via the user interface, and in response, outputting a numerical value that is represented by the selected object via the user interface.

* * * * *